United States Patent

[11] 3,622,177

| [72] | Inventors | Richard Lee Notestine<br>6654 S.E. Flavel St., Portland, Oreg. 97202;<br>Lee F. Coleman, Portland, Oreg. |
|---|---|---|
| [21] | Appl. No. | 867,462 |
| [22] | Filed | Oct. 20, 1969 |
| [45] | Patented | Nov. 23, 1971 |
| [73] | Assignee | said Notestine, by said Coleman |

[54] ROLL BAR CAGE FOR VEHICLES
1 Claim, 4 Drawing Figs.

[52] U.S. Cl. .................................................. 280/150 C, 296/102
[51] Int. Cl. .................................................. B60r 27/00
[50] Field of Search .................................................. 280/150 C, 150 F; 296/102

[56] References Cited
UNITED STATES PATENTS

| 2,479,036 | 8/1949 | Campbell | 296/102 |
| 2,729,462 | 1/1956 | Maybrier | 280/150 |
| 2,828,970 | 4/1958 | Ivey | 280/150 |
| 3,306,625 | 2/1967 | Ottosson | 296/102 X |
| 3,524,674 | 8/1970 | Medeiros | 280/150 |

FOREIGN PATENTS

| 1,265,317 | 5/1961 | France | 296/102 |
| 509,764 | 7/1939 | Great Britain | 296/102 |
| 185,176 | 9/1963 | Sweden | 280/150 |

*Primary Examiner*—Benjamin Hersh
*Assistant Examiner*—Winston H. Douglas
*Attorney*—James D. Givnan ABSTRACT: A framework in the form of spaced-apart roll bars permanently interconnected, reinforced and adapted as a unit for convenient securement to the body of vehicles such as jeeps, sport cars, and the like, having convertible tops, full or half fabric tops. The framework is made of metal pipes all of uniform diameter assembled as a unit by welding or the like to provide a strong, durable, rigid, cagelike frame which together with its manner of securement to the vehicle is such that passengers or occupants of the vehicle will be protected against rollover or other impact forces from any direction.

PATENTED NOV 23 1971
3,622,177
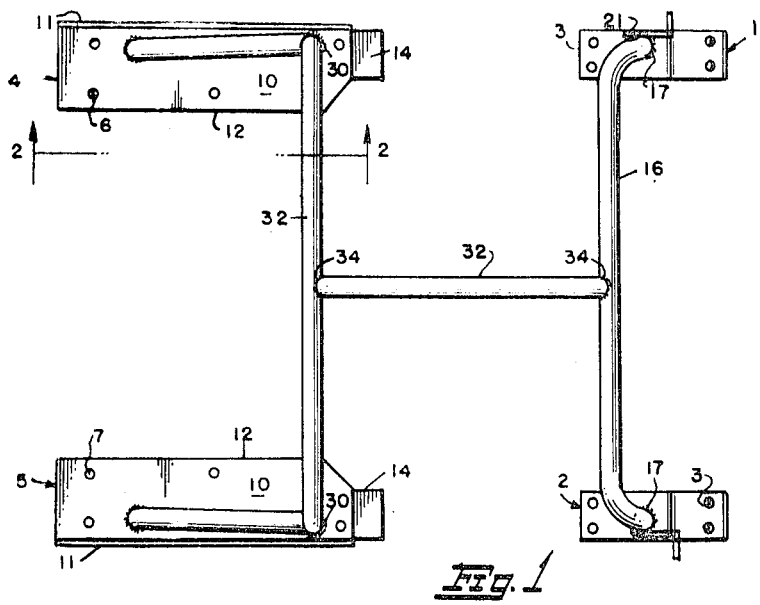
Fig. 1
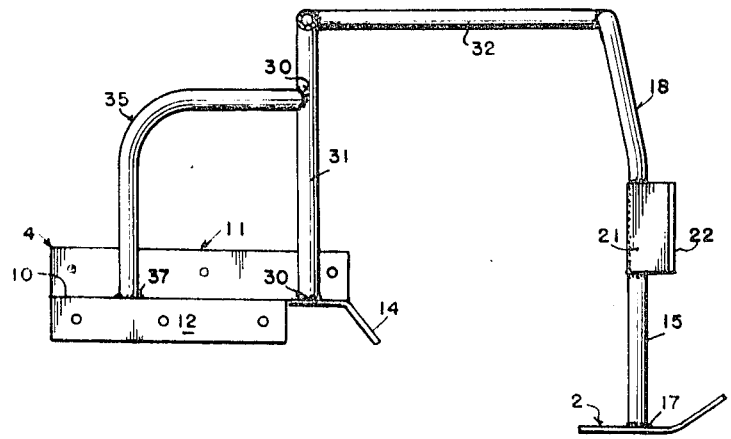
Fig. 2
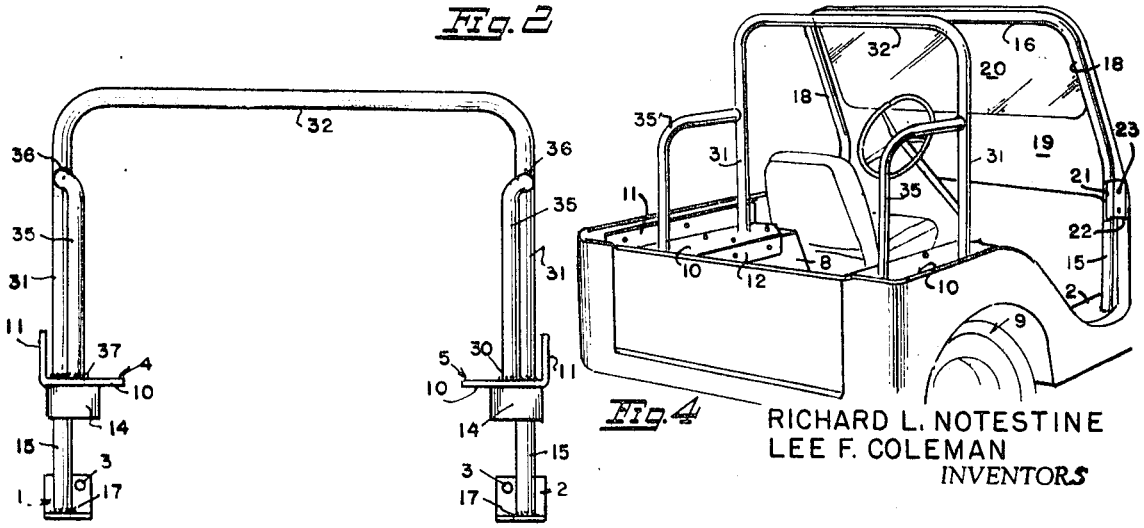
Fig. 3
Fig. 4
RICHARD L. NOTESTINE
LEE F. COLEMAN
INVENTORS
BY James H Givnan
ATT'Y

ROLL BAR CAGE FOR VEHICLES

The principal objects of the invention are:

To provide a unit as above described which is of efficient, durable and inexpensive construction, made by the use of simple bending jigs and welding operations into a unitary structure adapted for rigid securement to the vehicle body on the interior thereof and matching the dimensional height, width and length of the vehicle body.

The foregoing and other objects and advantages which will become subsequently apparent reside in the details of construction and operation as more fully hereinafter described and claimed, reference being had to the accompanying drawing forming a part hereof, and in which:

FIG. 1 is a top plan view of a framework made in accordance with our invention.

FIG. 2 is a side elevational view of FIG. 1 with a portion in section as viewed along the line 2—2 of FIG. 1.

FIG. 3 is a rear elevational view of FIG. 2, and

FIG. 4 is a perspective fragmentary view of a Jeep body equipped with the framework.

With continuing reference to the drawing wherein like reference numerals designate like parts, numerals 1 and 2 indicate forward baseplates adapted for securement as at 3 either to the floorboards of the vehicle body or through the floorboards to the frame or chassis of the vehicle.

Numerals 4 and 5 indicate generally two rearward base members which are identical except for their right- and left-hand disposition, adapted as at 6 and 7 for bolted securement to the built-in superimposed housings 8 for the rear wheels 9 of the vehicle. Each base member comprises a flat plate 10 flanged upwardly as at 11 along its outside, downwardly as at 12 along its inside and partially downward as at 14 across its front end.

The bottom end of the legs 15 of the forward inverted U-shaped roll bar 16 are welded as at 17 to the flat horizontal portion of the forward baseplates 1 and 2. The legs 15 are bent rearwardly from the vertical as at 18 to conform to the contour of the dashboard 19 and windshield 20 of the vehicle. The vertical portion of each leg 15 has one flange 21 of an angle section welded thereto with the other flange 22 adapted for bolted securement as at 23 to the sides of the body.

Welded as at 30 to the flat plates 10 of the base members 4 and 5 are the bottom ends of the legs 31 of a rearward roll bar indicated generally at 32. This roll bar extends upwardly to the height of roll bar 16 where both bars are interconnected by a stabilizing pipe 33 welded at both of its ends as at 34 to the front and rear roll bars.

The rear roll bar 32 is reinforced by a right-angular pipe 35 welded at one of its ends 36 to each leg 31 of the roll bar and at its opposite end to the plates 10 as at 37.

As shown in FIGS. 1 and 3, the vertical rearward end of the right-angular reinforcing pipes 35 are inset relative to the legs 31 of the rear roll bar 32 to provide space between the pipes and the vertical flanges 11 of base members 4 and 5 for normal raising and lowering of a conventional convertible top if the vehicle is to be provided with one.

From the foregoing it will be apparent that we have provided a roll bar cage which, because of the inherent strength of its structural components, their reinforced integration and new and novel rigid mounting to the vehicle, provides rugged dependability capable of absorbing rollover stresses and impact forces from any direction.

What we claim is:

1. In a vehicle having a body mounted upon a frame and comprising a forward section, a rearward section, and an operator's space between said sections, the rearward end of said front section defined by vertical vehicle body members interconnected by a dashboard, a framed windshield extending upwardly from the dashboard, and said rearward section having a downwardly opening wheel housing at each side thereof, the improvement comprising:
   a flat plate secured to and extending along the top wall of each of said wheel housings on the interior of the vehicle body,
   a roll bar cage comprising a first inverted U-shaped frame member secured at its bottom end to said vehicle frame,
   said inverted U-shaped member extending upwardly and bearing forwardly against said windshield frame,
   means fixedly securing said legs of said first U-shaped member to said rearward vertical ends of said forward section of the vehicle body,
   a second roll bar frame of inverted U-shape coextensive in height and width with said first roll bar and secured at its bottom ends to said flat plates of said wheel housings,
   said second roll bar reinforced by rearwardly extending right-angular members welded one each to each leg of said second roll bar and to said flat plates, and
   a forwardly and rearwardly extending reinforcing bar welded at its forward end to said first roll bar and at its rearward end to said second roll bar.

* * * * *